(12) United States Patent
Suzuki et al.

(10) Patent No.: US 11,097,191 B2
(45) Date of Patent: Aug. 24, 2021

(54) NON-TRANSITORY COMPUTER-READABLE STORAGE MEDIUM, TERMINAL DEVICE, AND INFORMATION PROCESSING SYSTEM

(71) Applicant: GREE, INC., Tokyo (JP)

(72) Inventors: Kiyoto Suzuki, Tokyo (JP); Peichao Yu, Tokyo (JP)

(73) Assignee: GREE, INC., Tokyo (JP)

( * ) Notice: Subject to any disclaimer, the term of this patent is extended or adjusted under 35 U.S.C. 154(b) by 180 days.

(21) Appl. No.: 16/200,223

(22) Filed: Nov. 26, 2018

(65) Prior Publication Data
US 2019/0184290 A1    Jun. 20, 2019

(30) Foreign Application Priority Data
Dec. 15, 2017 (JP) .............................. JP2017-240908

(51) Int. Cl.
*A63F 13/00* (2014.01)
*A63F 9/24* (2006.01)
(Continued)

(52) U.S. Cl.
CPC .............. *A63F 13/71* (2014.09); *A63F 13/35* (2014.09); *A63F 13/49* (2014.09); *A63F 13/73* (2014.09);
(Continued)

(58) Field of Classification Search
CPC ....... A63F 13/71; A63F 2300/532–537; H04L 63/0442; H04L 63/123
See application file for complete search history.

(56) References Cited

U.S. PATENT DOCUMENTS 6,754,179 B1 * 6/2004 Lin ...................... H04L 1/1803
370/235
6,763,371 B1 * 7/2004 Jandel ..................... G06F 9/542
370/260
(Continued)

FOREIGN PATENT DOCUMENTS

JP    2013-111106 A    6/2013
JP    5841280 B1    1/2016
(Continued)

OTHER PUBLICATIONS

Apr. 17, 2018 Office Action issued in Japanese Patent Application No. 2017-240908.

*Primary Examiner* — Milap Shah
(74) *Attorney, Agent, or Firm* — Oliff PLC

(57) ABSTRACT

A non-transitory computer-readable storage medium storing a program configured to cause a terminal device to execute a game in communication with a server device, the program includes: a first storing step of receiving from the server device at least one token generated and stored in the server device to store the token in a terminal storage unit; a transmitting step of transmitting to the server device information-to-be-transmitted including an updating instruction of game data of a user and encrypted information obtained by encrypting information-to-be-encrypted at least including the token; and a deleting step of deleting the token stored in the terminal storage unit, wherein the updating instruction includes a first instruction to update the game data stored in the server device when the token extracted by decrypting the encrypted information and the token stored in the server device are matched.

23 Claims, 9 Drawing Sheets

(51) Int. Cl.
*A63F 13/71* (2014.01)
*H04L 29/06* (2006.01)
*A63F 13/49* (2014.01)
*A63F 13/73* (2014.01)
*A63F 13/35* (2014.01)

(52) U.S. Cl.
CPC ........ *H04L 63/0442* (2013.01); *H04L 63/123* (2013.01); *A63F 2300/532* (2013.01); *A63F 2300/535* (2013.01); *A63F 2300/554* (2013.01); *H04L 67/38* (2013.01)

(56) References Cited

U.S. PATENT DOCUMENTS

| | | | |
|---|---|---|---|
| 9,336,522 B2 * | 5/2016 | Tsutsui | G06Q 20/3829 |
| 9,573,060 B2 | 2/2017 | Oku | |
| 2003/0054879 A1 * | 3/2003 | Schneier | G07F 17/3223 463/29 |
| 2004/0127277 A1 * | 7/2004 | Walker | G07F 17/3227 463/16 |
| 2004/0259640 A1 * | 12/2004 | Gentles | H04L 63/0272 463/42 |
| 2007/0202941 A1 * | 8/2007 | Miltenberger | G07F 17/3255 463/25 |
| 2010/0031051 A1 * | 2/2010 | Machani | H04L 9/3242 713/181 |
| 2010/0061390 A1 * | 3/2010 | Godbole | H04L 47/52 370/412 |
| 2012/0246301 A1 * | 9/2012 | Vyrros | A63F 13/335 709/224 |
| 2013/0138727 A1 | 5/2013 | Takemoto et al. | |
| 2016/0019540 A1 * | 1/2016 | Tsutsui | G06Q 20/401 705/71 |
| 2016/0082352 A1 | 3/2016 | Oku | |

FOREIGN PATENT DOCUMENTS

| | | |
|---|---|---|
| JP | 2016-066845 A | 4/2016 |
| JP | 2017-079421 A | 4/2017 |

* cited by examiner

[FIG. 1]
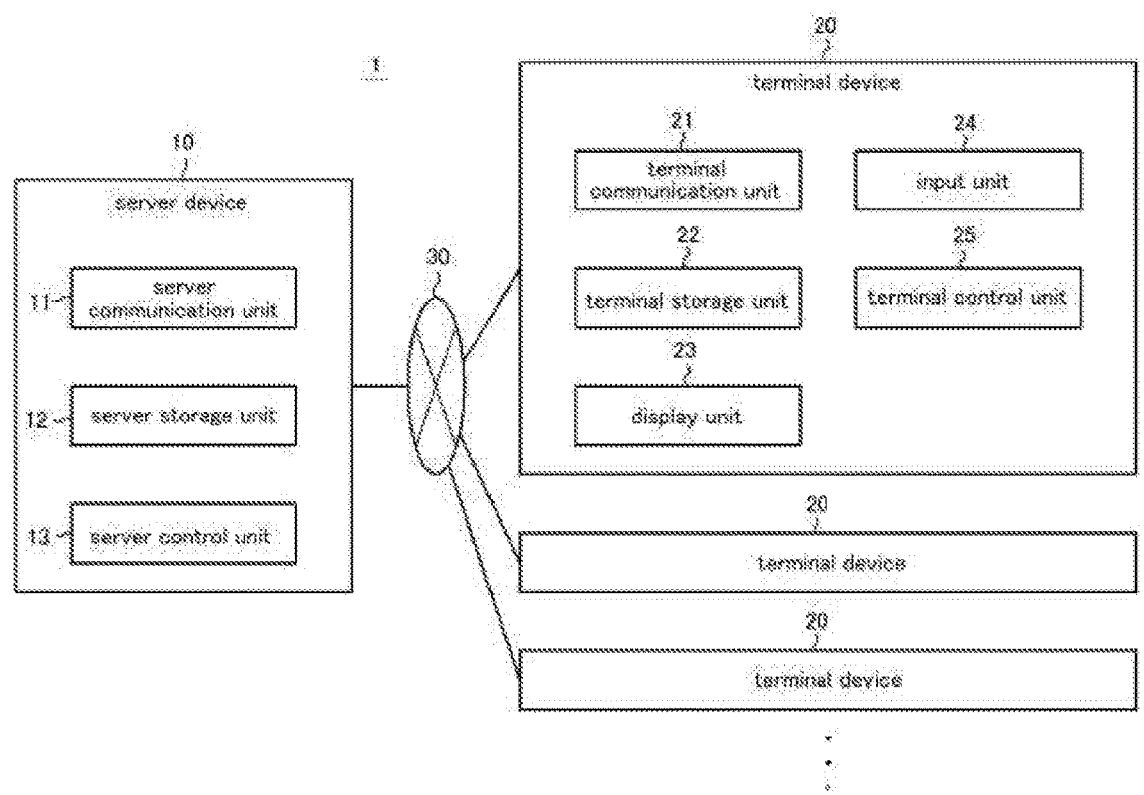

[FIG. 2]
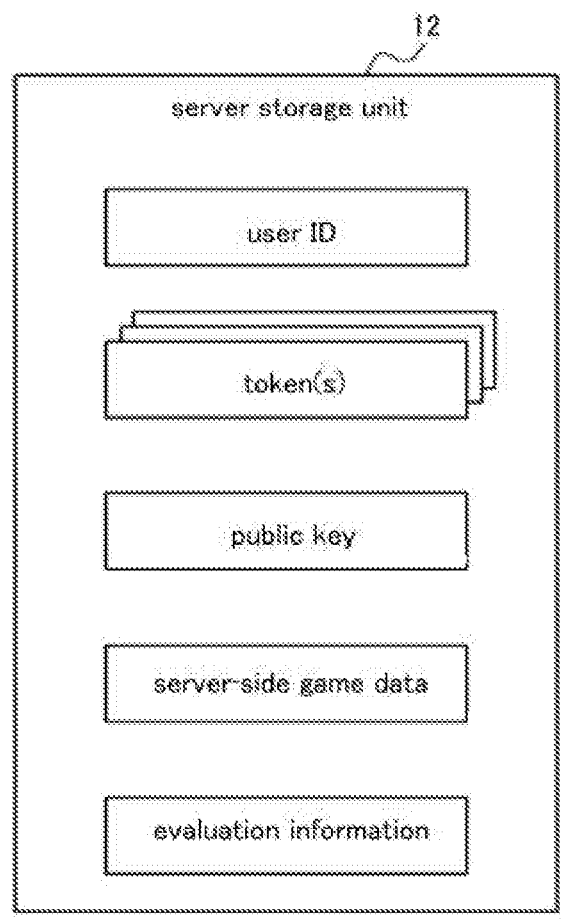

[FIG. 3]
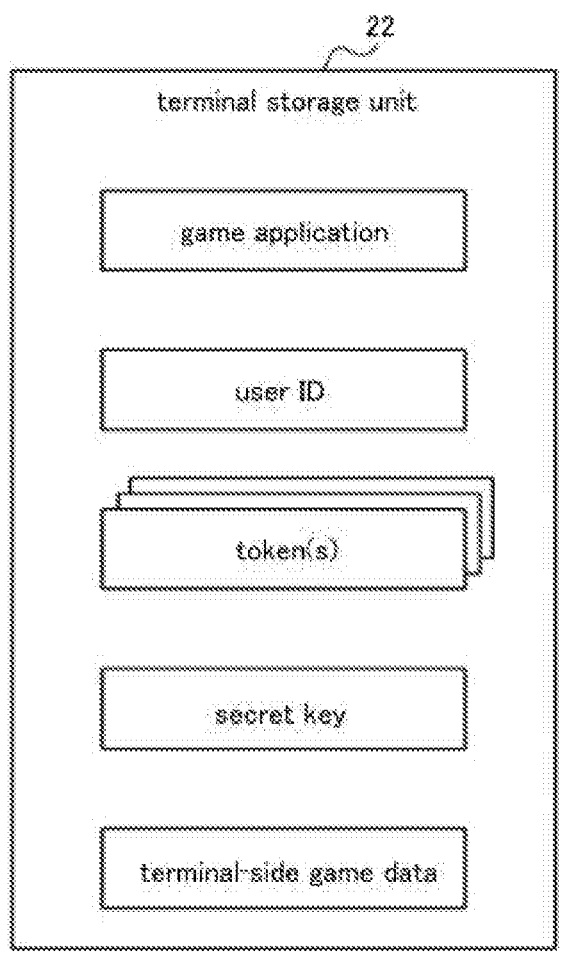

[FIG. 4]

| update information | | | |
|---|---|---|---|
| user ID | difference data | signature ID | ... |
| UID001 | *** | SID001 | ... |

[FIG. 5]

| information-to-be-encrypted | | | |
|---|---|---|---|
| signature ID | token(s) | information for reproduction | ... |
| SID001 | T001 | *** | ... |

[FIG. 6]
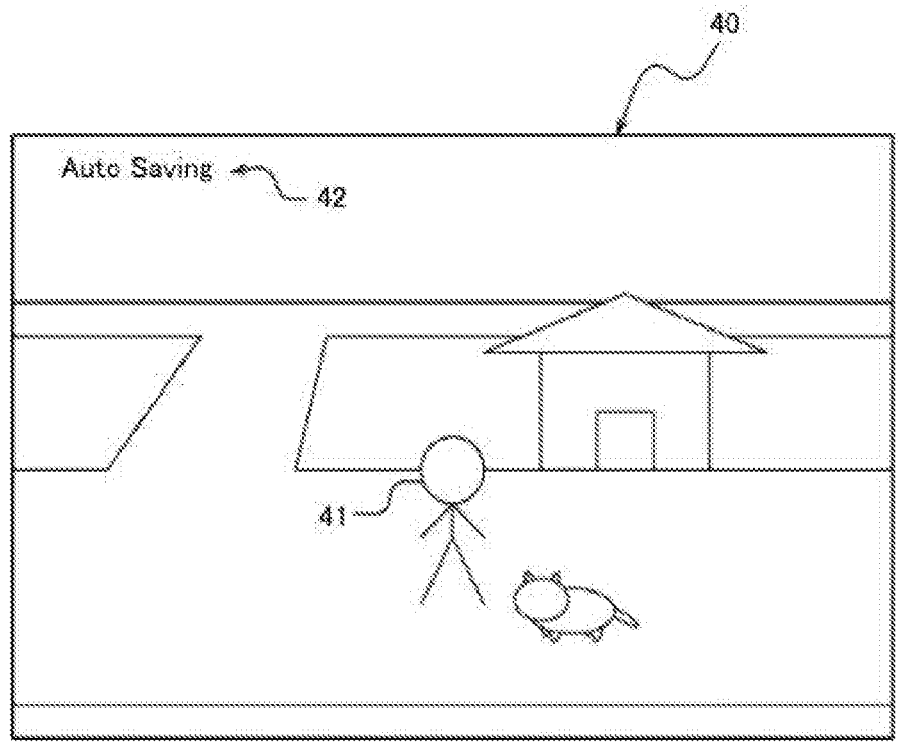
[FIG. 7]
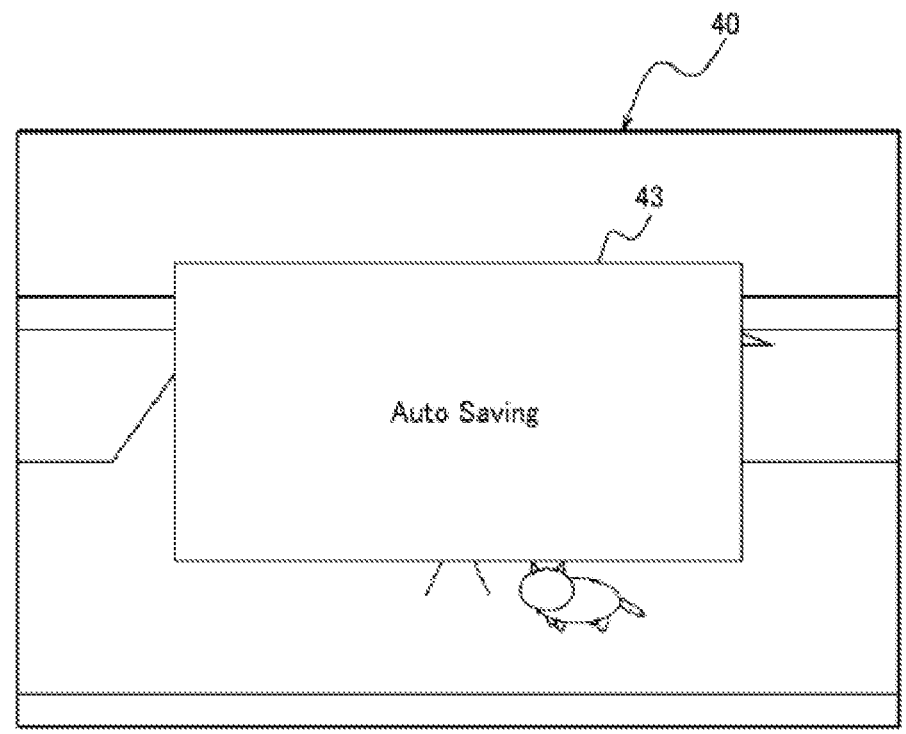

[FIG. 8]
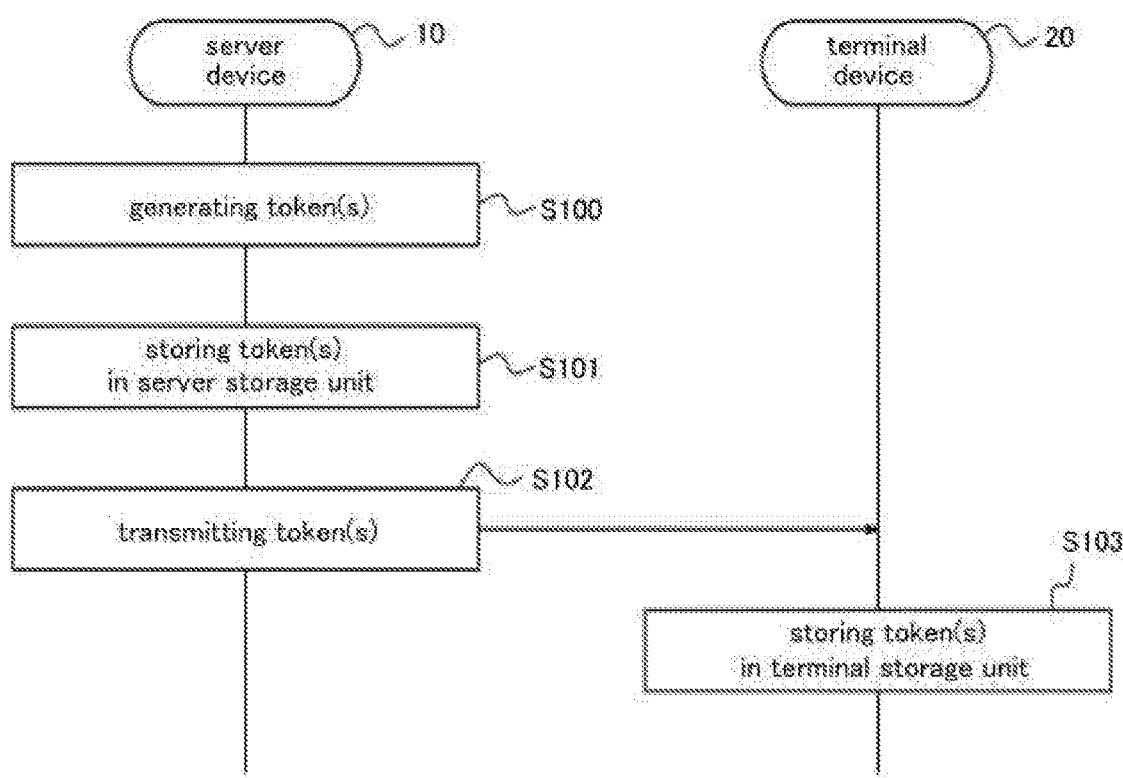

[FIG. 9]
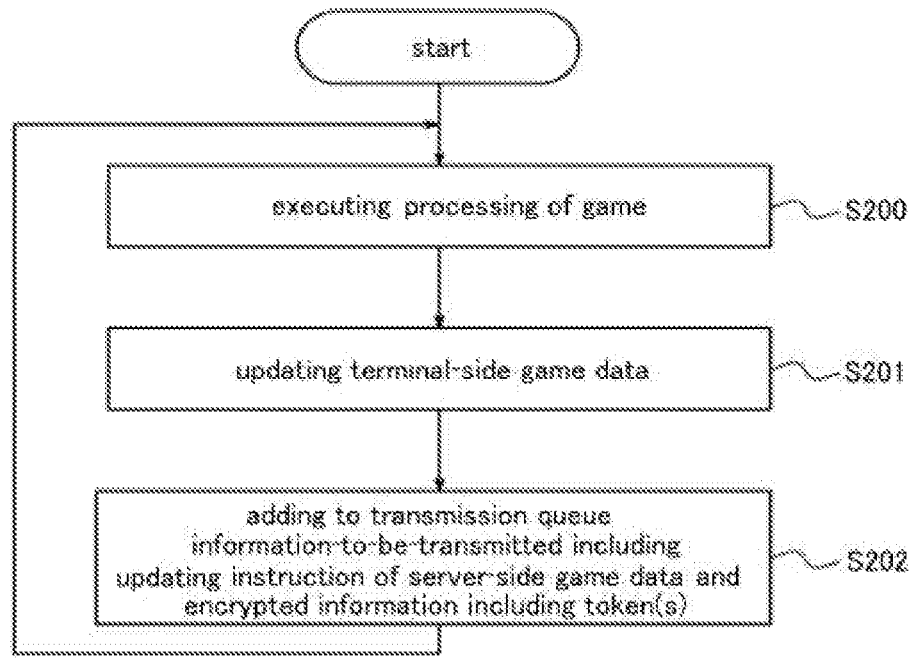

[FIG. 10]
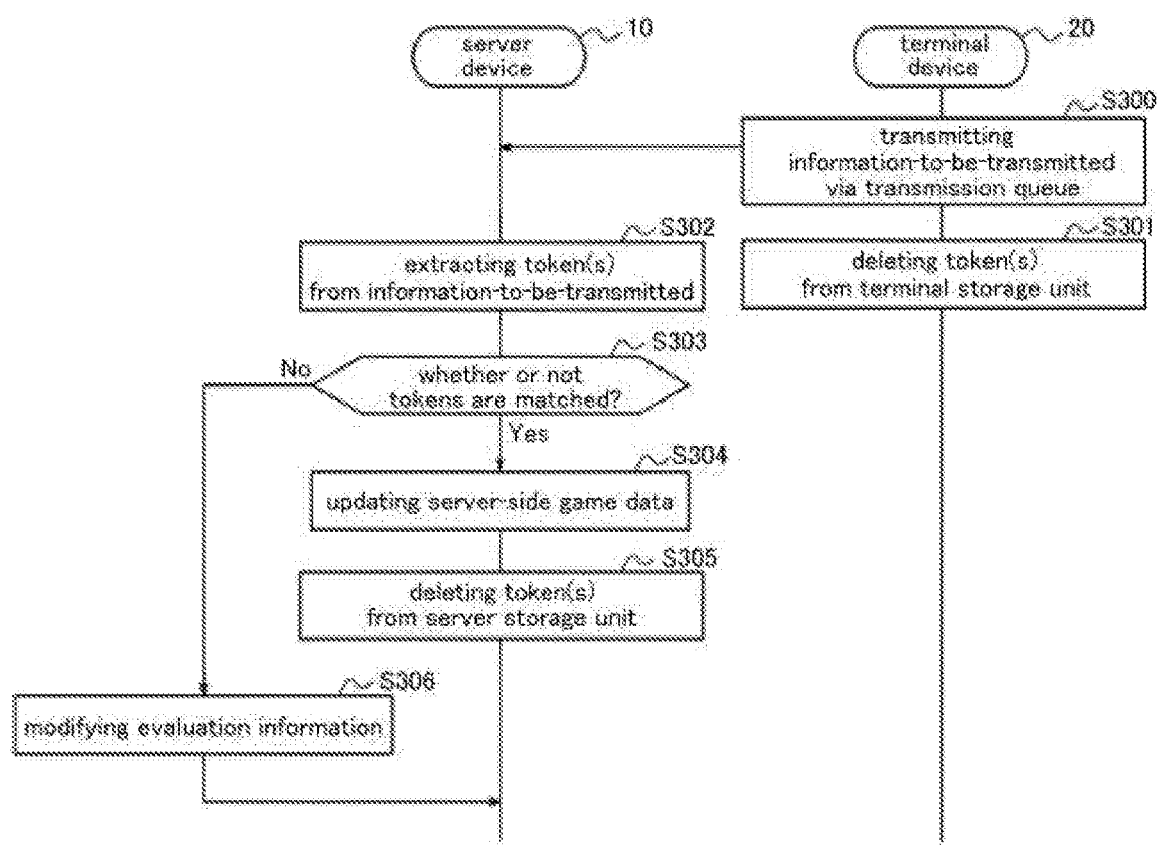

[FIG. 11]
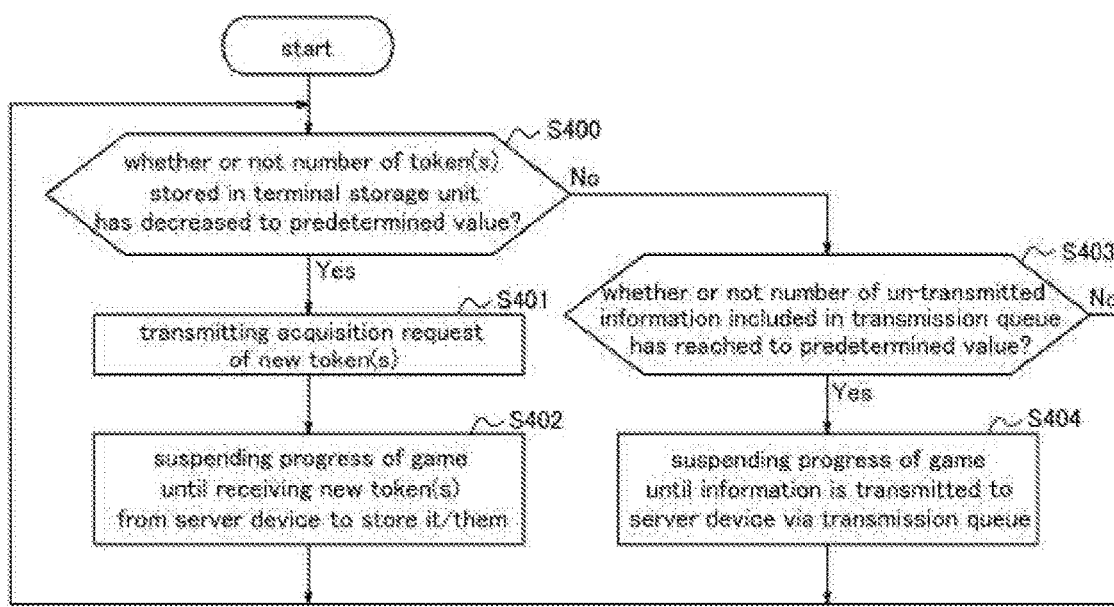

NON-TRANSITORY COMPUTER-READABLE STORAGE MEDIUM, TERMINAL DEVICE, AND INFORMATION PROCESSING SYSTEM

TECHNICAL FIELD

The present invention relates to a non-transitory computer-readable storage medium, a terminal device, and an information processing system.

BACKGROUND ART

Conventionally, known is an information processing system including information processing devices such as a server device and a terminal device to provide a game to a user(s). For example, Patent Document 1 discloses a game system that includes a server device and a plurality of terminal devices to provide a game in which users play battles against each other.

CITATION LIST

Patent Literature

[Patent Literature 1] Japanese Patent No. 5841280

SUMMARY OF INVENTION

Technical Problem

In an information processing system including a server device and a terminal device, known is a configuration in which game data of a user are managed by the server device. For example, when a user plays a game using the terminal device, the server device and the terminal device communicate with each other so that the game data of such user (for example, a high score of the user in the game, etc.) stored in the server device are updated. However, in the conventional technology, there is the probability that, for example, falsified information is transmitted from the terminal device to the server device due to fraudulent action of a user resulting in that the game data of such user stored in the server device are falsified. Therefore, it is desired to reduce the probability that the game data are falsified due to fraudulent action of a user.

An object of the present invention in view of such circumstances is to provide a non-transitory computer-readable storage medium, a terminal device and an information processing system, in which the probability that game data are falsified due to fraudulent action of a user who uses a terminal device is reduced.

Solution to Problem

In accordance with a first aspect of the present invention, in a non-transitory computer-readable storage medium storing a program configured to cause a terminal device to execute a game in communication with a server device, the program includes: a first storing step of receiving from the server device at least one token generated and stored in the server device to store the token in a terminal storage unit; a transmitting step of transmitting to the server device information-to-be-transmitted including an updating instruction of game data of a user and encrypted information obtained by encrypting information-to-be-encrypted at least including the token; and a deleting step of deleting the token stored in the terminal storage unit, wherein the updating instruction includes a first instruction to update the game data stored in the server device when the token extracted by decrypting the encrypted information and the token stored in the server device are matched.

In accordance with a second aspect of the present invention, a terminal device executing a game in communication with a server device includes: a terminal storage unit; and a terminal control unit, wherein the terminal control unit executes: receiving from the server device a token generated and stored in the server device to store the token in the terminal storage unit; transmitting to the server device information-to-be-transmitted including an updating instruction of game data of a user and encrypted information obtained by encrypting information-to-be-encrypted at least including the token; and deleting the token stored in the terminal storage unit, wherein the updating instruction includes an instruction to update the game data stored in the server device when the token extracted by decrypting the encrypted information and the token stored in the server device are matched.

In accordance with a third aspect of the present invention, an information processing system executing a game includes: a server device; and a terminal device, wherein the server device executes: storing game data of a user in a server storage unit; generating a token to store the token in the server storage unit; and transmitting the token to the terminal device, wherein the terminal device executes: receiving the token from the server device to store the token in a terminal storage unit; transmitting to the server device information-to-be-transmitted including an updating instruction of the game data of the user and encrypted information obtained by encrypting information-to-be-encrypted at least including the token; and deleting the token stored in the terminal storage unit, wherein the server device executes: receiving the information-to-be-transmitted from the terminal device to decrypt the encrypted information included in the information-to-be-transmitted and extract the token; updating the game data stored in the server storage unit based on the updating instruction when the extracted token and the token stored in the server storage unit; and deleting the token stored in the server storage unit.

Advantageous Effects of Invention

According to a non-transitory computer-readable storage medium, a terminal device and an information processing system of an embodiment of the present invention, the probability that game data are falsified due to fraudulent action of a user who uses a terminal device is reduced.

BRIEF DESCRIPTION OF DRAWINGS

FIG. 1 is a block diagram of an information processing system according to an embodiment of the present invention.

FIG. 2 is a diagram showing an example of information stored in a server device.

FIG. 3 is a diagram showing an example of information stored in a terminal device.

FIG. 4 is a diagram showing an example of update information generated by the terminal device.

FIG. 5 is a diagram showing an example of information-to-be-encrypted generated by the terminal device.

FIG. 6 is a diagram showing an example of a first screen displayed by the terminal device.

FIG. 7 is a diagram showing an example of a second screen displayed by the terminal device.

FIG. 8 is a sequence diagram showing a first behavior of the information processing system.

FIG. 9 is a flowchart showing a second behavior of the terminal device.

FIG. 10 is a sequence diagram showing a third behavior of the information processing system.

FIG. 11 is a flowchart showing a fourth behavior of the terminal device.

DESCRIPTION OF EMBODIMENTS

Hereinafter, embodiments of the present invention are described.

(Configuration of Game System)

With reference to FIG. 1, an outline of an information processing system 1 according to an embodiment of the present invention is described. The information processing system 1 includes a server device 10 and one or more terminal device(s) 20. Although FIG. 1 shows three terminal devices 20 for convenience, the number of terminal devices 20 may be arbitrarily set.

The server device 10 is, for example, an information processing device such as a server to be managed by a game administrator. The terminal device 20 is, for example, an information processing device to be used by a user, such as a mobile phone, a smartphone, a tablet terminal, a PC (Personal Computer), a game device or the like. The terminal device 20 can execute an application program of a game according to the embodiment. Hereinafter, an application program is also simply referred to as an application. The application of the game may be retrieved, for example, from a predetermined application distribution server via a network 30 such as the Internet to the terminal device 20, alternatively it may be in advance stored in a storage device provided in the terminal device 20 or a storage medium such as a memory card readable by the terminal device 20. The server device 10 and the terminal device 20 are communicably connected via the network 30.

The server device 10 and the terminal device 20 execute multiple processing related to the game in cooperation. For example, the server device 10 and the terminal device 20 may execute a series of processing through division. Further, for example, the server device 10 and the terminal device 20 may execute the same processing, respectively. With respect to such same processing, when processing results are matched between the server device 10 and the terminal device 20, the server device 10 and the terminal device 20 may complete such processing. On the other hand, when processing results are not matched between the server device 10 and the terminal device 20, the server device 10 and the terminal device 20 may complete such processing with the processing result of the server device 10 as true, alternatively processing may be turned back to a phase before executing such same processing. According to such a configuration, for example, even when communication quality between the server device 10 and the terminal device 20 temporarily deteriorates, the probability that processing is immediately suspended is decreased. Further, in the terminal device 20, even when fraudulent processing such as rewriting of parameter or the like are performed, the probability that such fraudulent processing can be eliminated is improved.

(Outline of Game)

An outline of the game according to the embodiment is described. The game according to the embodiment includes one or more game part(s). At least one of one or more game part(s) may be executed using a game content as described later. During execution of the game part, the game content may be operated, for example, by a user or AI (Artificial Intelligence). AI may be realized by a processor(s) provided in the server device 10 or the terminal device 20, for example.

The game content is electronic data to be used in the game and includes any medium such as a card, an item, a virtual currency, a ticket, a character, an avatar, level information, status information, parameter information (health point value, offensive power, etc.), capability information (skill, ability, spell, job, etc.) and the like. The game content is also electronic data that can be acquired, owned, used, managed, exchanged, synthesized, strengthened, sold, discarded, donated or the like by a user in the game, but usage modes of the game content are not limited to what are specified in the present description.

Hereinafter, unless otherwise specified, "a game content owned by a user" means the game content associated with a user ID capable of uniquely identifying such user. Also, "to give a game content to a user" means that the game content is associated with a user ID. Also, "to destroy a game content owned by a user" means that the association between a user ID and the game content is cancelled. Also, "to consume a game content owned by a user" means that some effect or influence can be exerted in the game in response to cancellation of the association between a user ID and the game content. Also, "to sell a game content owned by a user" means that the association between a user ID and the game content is cancelled and another game content (for example, a virtual currency or an item etc.) is associated with the user ID. Also, "to transfer a game content owned by a user A to a user B" means that the association between a user ID of the user A and the game content is cancelled and such game content is associated with a user ID of the user B. Also, "to create a game content" means that at least a part of information on the game content is defined or determined.

A game part may include any content that a user can play in the game. For example, the game part may include any content such as a quest, a mission, a mini game, acquisition/training/strengthening/synthesis of a game content, searching of a virtual space, a battle against an opponent (for example, another user, an enemy character, an enemy's building, etc.). In each game part, one or more predetermined game task(s) may be set. When it is determined that one or more game task(s) set for the game part to be played by a user has/have been successfully achieved, for example, a game content or the like may be given to the user as a reward. Any task according to the content of the game part can be adopted as the game task(s), for example, including a task of winning a battle against an enemy character, a task of reaching a goal point in a virtual space, and a task that a user's character does not come into a predetermined state (for example, a state that degree of soundness as described later is zero) until a predetermined time passes. Further, that a specific game task (a task of completing) among one or more game task(s) set in the game part is achieved is also referred to as completing of the game part. When the user who plays the game part succeeds in achieving the task of completing, it is determined that such game part is completed, and thereby such game part may end.

A single-play part and a multi-play part may be included in one or more game parts. The single-play part may include, for example, a game part (for example, a one-person game part) to be executed based on user's operation with respect to one terminal device 20 used by one user. For example, the single-play part is executed using one terminal device 20 independently or using one terminal device 20 and the server device 10 in cooperation. On the other hand, the multi-play part may include, for example, a game part (for example, a plural-persons game part) common to two or more users to be executed based on users' operation with respect to two or more terminal devices respectively used by such two or more users. The game part common to two or more users may include, for example, a game part in which at least a part of processing of progress of such game part and at least a part of processing results are applied to such two or more users in common. For example, the multi-play part is executed using two or more terminal devices 20 in cooperation or using two or more terminal devices 20 and the server device 10 in cooperation. The multi-play part may include a game part in which a plurality of users play battles against or cooperate with each other in the game. One game part may correspond to both of the single-play part and the multi-play part.

An outline of the embodiment is described. The server device 10 and the terminal device 20 store game data of a user, respectively. Hereinafter, game data stored in the server device 10 are also referred to as server-side game data, and game data stored in the terminal device 20 are also referred to as terminal-side game data. The game data of the user are data used for execution of the game and include any data inherent in such user. The game data may include saved data of the game. The game data can be updated in response to execution of any processing related to the game.

The server-side game data and the terminal-side game data are managed so as to be matched with each other. However, when the terminal-side game data are falsified, for example, due to fraudulent action of a user, the server-side game data and the falsified terminal-side game data are not always matched with each other. Here, when the game is RPG (Role-Playing Game), an example of managing the server-side game data and the terminal-side game data is described. The user operates, for example, a user character placed in the virtual space to play a battle game part of playing a battle against an opponent such as an enemy character or the like and a search game part of searching a dungeon in a cave, a building or the like. For example, by executing processing of game of progressing the battle game part or the search game part, the user can acquire a game content such as a character, a weapon, an item or the like.

When the game content is acquired by the user, the terminal-side game data are updated. For example, when the user acquires an item, the terminal-side game data are updated so that the owned number of such item is increased. When the terminal-side game data are updated, an instruction to update the server-side game data (an updating instruction) is transmitted from the terminal device 20 to the server device 10. The server device 10 updates the server-side game data based on the updating instruction received from the terminal device 20. In this manner, the server-side game data are updated so as to be matched with the terminal-side game data after updated. The content of the game is not limited to the above example of RPG, but may be arbitrarily determined, for example, in such a game as a racing game, a simulation game, a puzzle game or the like.

In the embodiment, the server-side game data are updated using token(s). Specifically, the server device 10 in advance generates and stores one or more token(s). Each token is any information distinguishable from each other. For example, the token is character string data in a predetermined number of bits, but it is not limited to this. The terminal device 20 in advance retrieves such one or more token(s) from the server device 10 to store it/them. When transmitting the updating instruction of the server-side game data as described above, the terminal device 20 transmits the token(s) together with the updating instruction to the server device 10. Upon transmitting, for example, the updating instruction and the token(s), the terminal device 20 deletes such token(s) stored therein. When the token(s) received from the terminal device 20 and the token(s) stored in advance in the server device 10 are matched, the server device 10 updates the server-side game data and deletes such token(s) stored therein.

On the other hand, when the token(s) received from the terminal device 20 and the token(s) stored in advance in the server device 10 are not matched, the server device 10 does not update the server-side game data. Hereinafter, the token(s) transmitted by the terminal device 20, which does/do not match the token(s) stored in advance in the server device 10, is/are also referred to as an improper token(s). And, the token(s) transmitted by the terminal device 20, which does/do match the token(s) stored in advance in the server device 10, is/are also referred to as a proper token(s).

Further, when receiving only the updating instruction without the token(s) from the terminal device 20, the server device 10 does not update the server-side game data. Hereinafter, the updating instruction transmitted by the terminal device 20 without the token(s) or together with the improper token(s) is also referred to as an improper updating instruction. The updating instruction transmitted by the terminal device 20 together with the proper token(s) is also referred to as a proper updating instruction.

According to such a configuration, the server-side game data are not updated unless the proper token(s) and the proper updating instruction are transmitted from the terminal device 20 to the server device 10. Therefore, for example, when the user falsifies the terminal-side game data due to fraudulent action, the probability that the server-side game data are updated so as to be matched with the terminal-side game data after falsified is reduced. Therefore, the probability that the game data are falsified due to fraudulent action of the user who uses the terminal device 20 is reduced. Hereinafter, more details on the embodiment are described.

(Configuration of Server Device)

A configuration of the server device 10 is specifically described. The server device 10 includes a server communication unit 11, a server storage unit 12, and a server control unit 13.

The server communication unit 11 includes one or more interface(s) that does/do communicate with an external device without wires or with wires to transmit and receive information. The server communication unit 11 may include, for example, a wireless LAN (Local Area Network) communication module, a wired LAN communication module or the like. The server communication unit 11 can transmit and receive information with the terminal device 20 via the network 30.

The server storage unit 12 includes one or more memory(ies). The memory(ies) may include, for example, a semiconductor memory, a magnetic memory, an optical memory or the like. Each memory included in the server storage unit 12 may function, for example, as a main storage device, an auxiliary storage device, or a cache memory. The server storage unit 12 stores information and programs to be used for processing of game.

With reference to FIG. 2, an example of information stored in the server storage unit 12 is described. The server storage unit 12 stores a user ID, one or more token(s), a public key, the server-side game data, and evaluation information with each user who uses the information processing system 1. One or more token(s), the public key, the server-side game data, and the evaluation information may be stored in association with the user ID.

The user ID is information capable of uniquely identifying a user. Hereinafter, the user ID is simply referred to as the user. The user ID may be determined to be stored in the server storage unit 12, for example, when the user starts using the information processing system 1 (for example, when establishing an account).

Each of one or more token(s) is any information distinguishable from each other as described above. As described later, the token(s) is/are generated by the server control unit 13 to be stored in the server storage unit 12. As described later, the token(s) stored in the server storage unit 12 is/are used for collation with the token(s) to be received from the terminal device 20.

The public key corresponds to a secret key stored in the terminal device 20 of the user as described later. The public key is in advance retrieved from, for example, the terminal device 20. As described later, the public key is used for decryption of information encrypted using the secret key.

The server-side game data are data used for execution of the game and include any data inherent in the user. For example, the server-side game data may include a game content owned by the user in the game, but it is not limited to this. As described above, the server-side game data can be updated so as to be matched with the terminal-side game data stored in the terminal device 20.

The evaluation information is information indicating evaluation of the user. As described later, the evaluation information can be modified, for example, to make evaluation of the user lower every time the improper token(s) or the improper updating instruction is/are transmitted from the terminal device 20 to the server device 10. As described later, the evaluation information may be used for determination on whether or not the account of the user is suspended, for example. By suspending the account, a game play by the user can be prohibited. Also, the evaluation information may be used for determination on whether or not the terminal-side game data are updated so as to be matched with the server-side game data. For example, the terminal-side game data equivalent to game data after falsified can be updated so as to be matched with the server-side game data equivalent to game data before falsified.

The server control unit 13 shown in FIG. 1 includes one or more processor(s). The processor(s) may include a general processor and an exclusive processor dedicated to specific processing. The server control unit 13 controls overall behaviors of the server device 10. For example, the server control unit 13 can transmit and receive information via the server communication unit 11. The server control unit 13 can store information in the server storage unit 12. More details on behaviors of the server control unit 13 are described later.

(Configuration of Terminal Device)

A configuration of the terminal device 20 is specifically described. As shown in FIG. 1, the terminal device 20 includes a terminal communication unit 21, a terminal storage unit 22, a display unit 23, an input unit 24, and a terminal control unit 25.

The terminal communication unit 21 includes an interface that communicates with an external device without wires or with wires to transmit and receive information. The terminal communication unit 21 may include a wireless communication module compliant with a mobile communication standard such as LTE (Long Term Evolution) (registered trademark), a wireless LAN communication module, a wired LAN communication module or the like. The terminal communication unit 21 can transmit and receive information with the server device 10 via the network 30.

The terminal storage unit 22 includes one or more memory(ies). Each memory included in the terminal storage unit 22 may function, for example, as a main storage device, an auxiliary storage device, or a cache memory. The terminal storage unit 22 may be incorporated in the terminal device 20 or may be connected to the terminal device 20 via any interface. The terminal storage unit 22 stores information and programs to be used for processing of game.

With reference to FIG. 3, an example of information stored in the terminal storage unit 22 is described. The terminal storage unit 22 stores a game application, a user ID, one or more token(s), a secret key, and the terminal-side game data.

The game application is an application to execute the game according to the embodiment. For example, in a state that the game application is activated, a user can play the game.

The user ID is information capable of uniquely identifying the user and corresponds to the user ID stored in the server storage unit 12 as described above.

Each of one or more tokens is any information distinguishable from each other. As described later, when the token(s) is/are transmitted from the server device 10 to the terminal device 20, the token(s) is/are stored in the terminal storage unit 22. Therefore, one or more token(s) stored in the terminal storage unit 22 is/are identical to one or more tokens stored in the server device 10.

The secret key corresponds to the public key stored in the server storage unit 12 as described above. As described later, the secret key is used for encryption of information to be transmitted from the terminal device 20 to the server device 10.

The terminal-side game data are data used for execution of the game and include any data inherent in the user. As described above, the server-side game data stored in the server device 10 can be updated so as to be matched with the terminal-side game data.

The display unit 23 shown in FIG. 1 includes a display device such as a liquid crystal display, an organic EL display or the like. The display unit 23 can display various screens.

The input unit 24 includes any input interface that accepts user's operation. The input interface may include, for example, a pointing device such as a mouse, a physical key, a touch panel integrally provided in the display unit 23 and the like.

The terminal control unit 25 includes one or more processor(s). The terminal control unit 25 controls overall behaviors of the terminal device 20. For example, the terminal control unit 25 can transmit and receive information via the terminal communication unit 21. The terminal control unit 25 can store information in the terminal storage unit 22. The terminal control unit 25 can display information on the display unit 23. The terminal control unit 25 can detect user's operation onto the input unit 24. More details on behaviors of the terminal control unit 25 are described later.

(Exemplified Behaviors of Server Device and Terminal Device)

Exemplified behaviors of the server control unit 13 of the server device 10 and the terminal control unit 25 of the terminal device 20 are specifically described.

The server control unit 13 stores, as described above, the user ID, the public key, the server-side game data, and the evaluation information in the server storage unit 12. The server control unit 13 generates one or more token(s). The server control unit 13 stores such one or more token(s) in the server storage unit 12. The server control unit 13 transmits the generated such one or more token(s) to the terminal device 20. The terminal control unit 25 receives such one or more token(s) from the server device 10 to store it/them in the terminal storage unit 22. Accordingly, such one or more token(s) is/are stored in the server storage unit 12 and the terminal storage unit 22, respectively.

The terminal control unit 25 activates the game application, for example, in response to user's operation. The terminal control unit 25 executes processing of game, for example, in response to user's operation or automatically. The game part (for example, the battle game part of playing a battle against an opponent, the search game part of searching a dungeon, or the like) may progress through execution of processing of game. The terminal control unit 25 can update the terminal-side game data stored in the terminal storage unit 22 in response to results of execution of processing of game. For example, when the user wins the opponent resulting from execution of processing of game of the battle game part to acquire a game content, or when the user acquires a game content from a treasure box resulting from execution of processing of game of the search game part, the terminal-side game data are updated so that the owned number of such game content by the user is increased.

Upon updating the terminal-side game data, the terminal control unit 25 generates update information and information-to-be-encrypted including the token(s). More details of the update information and the information-to-be-encrypted are described later. The terminal control unit 25 adds information-to-be-transmitted to a transmission queue, wherein the information-to-be-transmitted includes: the updating instruction to update the server-side game data including the update information; and encrypted information obtained by encrypting the information-to-be-encrypted using the secret key. Any information may be added to the transmission queue because of being not limited to the information-to-be-transmitted. The terminal control unit 25 transmits the information-to-be-transmitted to the server device 10 via the transmission queue. The transmission of information via the transmission queue may be executed at any timing. For example, the transmission of information via the transmission queue may be executed in response to occurrence of a predetermined event in the game. Such event may include, for example, a transition event to a predetermined game screen, a transition event to a predetermined internal state in the game, an event where a predetermined game part starts or ends, or the like. The internal state of the game is, for example, a state that is in advance defined in response to a game part to be executed, processing of game or the like. Based on the internal state of the game, the game part or the processing of game or the like which has been executed can be identified. The terminal control unit 25 deletes the token(s) included in the transmitted information-to-be-transmitted from the terminal storage unit 22.

Here, the updating instruction and the information-to-be-encrypted are described in detail. The updating instruction of the server-side game data includes a first instruction and a second instruction. The first instruction is an instruction to update the server-side game data when the token(s) to be extracted by decrypting the encrypted information and the token(s) stored in the server storage unit 12 are matched. The second instruction is an instruction to modify the evaluation information stored in the server storage unit 12 when the token(s) to be extracted by decrypting the encrypted information and the token(s) stored in the server storage unit 12 are not matched.

Further, the updating instruction of the server-side game data includes, as shown in FIG. 4 for example, the update information having a user ID, difference data, and a signature ID. The difference data are information indicating the difference between before and after updating the terminal-side game data when the terminal-side game data are updated resulting from execution of processing of game as described above. For example, when the owned number of game content by the user has been increased from 1 piece to 6 pieces through updating the terminal-side game data, the difference data may include an ID of such game content and a difference value (+5 pieces) of the owned number of such game content by the user. The signature ID is identical to the signature ID included in the information-to-be-encrypted as described later. The updating instruction and the update information are associated with the information-to-be-encrypted via the signature ID. The updating instruction of the server-side game data is not limited to the above example and may include any information to be used for update of the server-side game data.

As shown in FIG. 5 for example, the information-to-be-encrypted includes the signature ID, the token(s), and information for reproduction. The signature ID is information capable of uniquely identifying the information-to-be-encrypted. The token(s) is/are selected among one or more token(s) stored in the terminal storage unit 22. The information for reproduction includes any information used for reproduction of such processing of game when the terminal-side game data are updated resulting from execution of processing of game by the terminal control unit 25 as described above. Here, "reproduction" includes that another device other than the terminal device 20 obtains the same result by executing the same processing as processing of game executed by the terminal control unit 25, for example. Such another device may be, for example, the server device 10, or may be an information processing device such as a computer or a smartphone to be used by a game provider or a game developer.

A specific example of the information for reproduction is described. For example, when processing of game includes processing of progressing some game parts among a plurality of game parts included in the game, the information for reproduction may include information indicating the game part that has been progressed by processing of game. The information indicating the game part may be, for example, information capable of uniquely identifying the game part, or may be information indicating a kind (for example, the battle game part or the search game part, etc.) of the game part. According to the information indicating the game part, the game part in which such processing of game has been executed can be identified.

Further, the information for reproduction may include information indicating a game parameter(s) used during execution of the processing of game by the terminal control unit 25. More specifically, when the processing of game includes processing of progressing the battle game part, for example, parameter(s) or the like of each character (for example, identification information, health point, and offensive power of character, etc.) against whom battles are played may be used as the game parameter(s) for execution of such processing of game. Alternatively, when the processing of game includes processing of progressing the search game part, for example, parameter(s) or the like of a dungeon (for example, identification information of dungeon, identification information of a treasure box being present and opened by the user, etc.) which is a target for search may be used as the game parameter(s) for execution of such processing of game.

Information included in the information for reproduction is not limited to the above example and may be arbitrarily determined in response to content of the processing of game. For example, when the processing of game includes processing of lottery using random seed to be retrieved from the server device 10, the information for reproduction may include at least one of a random seed value used in such processing of lottery, a result value of lottery, a minimum value of lottery, a maximum value of lottery, and the number of trials of lottery.

The content of the information for reproduction is not limited to the above example. For example, the information for reproduction may include any information used for reproduction of the processing of game, such as log information when the processing of game is executed by the terminal control unit 25. The log information may include any information used for the processing of game, such as game operation information by the user or AI, information indicating the internal state of the game and the like.

By executing reproduction of the processing of game using the above-described information for reproduction, the result of such processing of game executed by the terminal control unit 25 and the result of such processing of game reproduced using the information for reproduction are matched. On the other hand, for example, when the result of the processing of game executed by the terminal control unit 25 has been falsified due to fraudulent action of the user (for example, the result of "the user acquires items in 5 pieces" has been falsified to the result of "the user acquires items in 100 pieces), the result of such processing of game executed with falsification and the result of such processing of game reproduced using the information for reproduction come into being not matched. Therefore, by using the information for reproduction, for example, the probability that a game provider or a game developer can find fraudulent action by the user is improved. Reproduction of the processing of game using the information for reproduction may be executed by the server device 10 or may be executed by an exclusive information processing device (for example, a batch server that reproduces each of a plurality of processing of game by batch processing).

Upon receiving the above-described information-to-be-transmitted from the terminal device 20, the server control unit 13 decrypts the encrypted information included in such information-to-be-transmitted using the public key. The server control unit 13 extracts the updating instruction and the token(s) included in the encrypted information after decrypted (that is, the above-described information-to-be-encrypted). The server control unit 13 determines whether or not such extracted token(s) and the token(s) stored in the server storage unit 12 are matched.

When it is determined that the both are matched, the server control unit 13 updates the server-side game data based on the first instruction included in the updating instruction. For example, when the difference data included in the updating instruction includes the ID of the game content acquired by the user and the difference value (+5 pieces) of the owned number of such game content of the user, the server control unit 13 updates the server-side game data so as to increase the owned number of such game content of the user by 5 pieces. The server control unit 13 may delete such token(s) stored in the server storage unit 12 or may stock such token(s) in the log information as a used token(s), for example.

On the other hand, when it is determined that the both are not matched, the server control unit 13 does not update the server-side game data but modify the evaluation information stored in the server storage unit 12 based on the second instruction included in the updating instruction. For example, the server control unit 13 may modify the evaluation information so as to make the evaluation of the user lower.

Further, when receiving only the updating instruction without receiving the token(s) from the terminal device 20, the server control unit 13 does not update the server-side game data but modify the evaluation information stored in the server storage unit 12. For example, the server control unit 13 may modify the evaluation information so as to make the evaluation of the user lower.

As described above, when the token(s) received from the terminal device 20 and the token(s) in advance stored in the server storage unit 12 are matched, the server control unit 13 updates the server-side game data. On the other hand, when the both are not matched, or when receiving only the updating instruction without receiving the token(s) from the terminal device 20, the server control unit 13 does not update the server-side game data. According to such a configuration, for example, when the user has falsified the terminal-side game data due to fraudulent action, the probability that the server-side game data are updated so as to be matched with the terminal-side game data after falsified is reduced. Therefore, the probability that the game data are falsified due to fraudulent action of the user who uses the terminal device 20 is reduced.

Further, as described above, every time the terminal control unit 25 transmits the information-to-be-transmitted to the server device 10, the terminal control unit 25 deletes the token(s) included in such information-to-be-transmitted from the terminal storage unit 22. Here, the terminal control unit 25 may determine whether or not the number of token(s) stored in the terminal storage unit 22 has decreased to a predetermined value. When it is determined that the number of token(s) has decreased to the predetermined value, the terminal control unit 25 transmits a retrieving request of a new token(s) to the server device 10. In response to such retrieving request, the server control unit 13 generates a new token(s), stores it/them in the server storage unit 12, and transmits it/them to the terminal device 20. The terminal control unit 25 receives such new token(s) from the server device 10 to store it/them in the terminal storage unit 22.

The terminal control unit 25 may execute processing of receiving the new token(s) from the server device 10 to store it/them in the terminal storage unit 22 in the background while the game is in progress. When such processing is executed in the background, the new token(s) is/are received from the server device 10 to be stored without suspending progress of the game.

Alternatively, the terminal control unit 25 may execute the processing of receiving the new token(s) from the server device 10 to store it/them in the terminal storage unit 22 in the foreground. When such processing is executed in the foreground, progress of the game is suspended until the new token(s) is/are received from the server device 10 to be stored. For example, the terminal control unit 25 may suspend progress of the game until the new token(s) is/are received from the server device 10 to be stored in the terminal storage unit 22. While progress of the game is suspended, the terminal control unit 25 may display, for example, exclusive information (for example, a message indicating that the terminal device 20 and the server device 10 are under communication) or a predetermined game screen (for example, a title screen displayed at the beginning of the game) on the display unit 23. According to such a configuration, for example, the probability that inconvenience making the proper updating instruction impossible to be transmitted due to lack of token(s) stored in the terminal storage unit 22 is caused is reduced.

Furthermore, as described above, the server control unit 13 transmits information such as the information-to-be-transmitted to the server device 10 via the transmission queue. Here, the terminal control unit 25 may determine whether or not the number of un-transmitted information included in the transmission queue has increased to reach a first predetermined value.

When it is determined that the number of un-transmitted information has not reached the first predetermined value, the terminal control unit 25 executes processing of transmitting information to the server device 10 via the transmission queue in the background while the game is in progress. When such processing is executed in the background, the un-transmitted information included in the transmission queue is transmitted to the server device 10 without suspending progress of the game. The terminal control unit 25 may display any information suggesting to the user that the terminal device 20 and the server device 10 are under communication in the background on a game screen for progressing the game.

A game screen 40 as shown in FIG. 6, for example, is an example of a screen for progressing the game according to the embodiment. A user character 41 and a first information 42 are displayed on the game screen 40. The user character 41 is movable within the virtual space, for example, in response to user's operation or automatically. The first information 42 includes any information suggesting to the user that the terminal device 20 and the server device 10 are under communication in the background. In the example shown in FIG. 6, a message of "Auto Saving" is displayed as the first information 42. The user who has viewed the first information 42 can recognize that the terminal device 20 and the server device 10 are under communication in the background.

On the other hand, when it is determined that the number of un-transmitted information has reached the first predetermined value, the terminal control unit 25 executes processing of transmitting information to the server device 10 via the transmission queue in the foreground. When such processing is executed in the foreground, progress of the game is suspended until the un-transmitted information included in the transmission queue is transmitted to the server device 10. For example, the terminal control unit 25 may suspend progress of the game until at least one of information is transmitted to the server device 10 via the transmission queue. Further, for example, the terminal control unit 25 may suspend progress of the game until the number of un-transmitted information included in the transmission queue reaches a second predetermined value smaller than the first predetermined value. While progress of the game is suspended, the terminal control unit 25 may display a predetermined game screen (for example, a title screen displayed at the beginning of the game). Alternatively, while progress of the game is suspended, the terminal control unit 25 may display any information suggesting to the user that the terminal device 20 and the server device 10 are under communication in the foreground on a game screen for progressing the game.

On the game screen 40 as shown in FIG. 7, for example, a second information 43 is displayed. The second information 43 includes any information suggesting to the user that the terminal device 20 and the server device 10 are under communication in the foreground. In the example shown in FIG. 7, a dialog box including a message of "Auto Saving" is displayed as the second information 43. The user who has viewed the second information 43 can recognize that the terminal device 20 and the server device 10 are under communication in the foreground.

With reference to FIG. 8, a flow of a first behavior of the information processing system 1 is described. The first behavior includes a behavior of the information processing system 1 in which one or more token(s) generated by the server device 10 is/are stored in the server device 10 and the terminal device 20, respectively.

In Step S100, the server device 10 generates one or more token(s).

In Step S101, the server device 10 stores such one or more token(s) in the server storage unit 12.

In Step S102, the server device 10 transmits such one or more token(s) after generated to the terminal device 20.

In Step S103, the terminal device 20 receives such one or more token(s) from the server device 10 to store it/them in the terminal storage unit 22.

With reference to FIG. 9, a flow of a second behavior of the terminal device 20 is described. The second behavior includes a behavior of the terminal device 20 in which the information-to-be-transmitted is added to the transmission queue.

In Step S200, the terminal device 20 executes processing of game, for example, in response to user's operation or automatically.

In Step S201, the terminal device 20 updates the terminal-side game data stored in the terminal storage unit 22 in response to the result of execution of the processing of game.

In Step S202, the terminal device 20 adds to the transmission queue the information-to-be-transmitted including the updating instruction of updating the server-side game data and the encrypted information obtained by encrypting the information-to-be-encrypted including the token(s).

With reference to FIG. 10, a flow of a third behavior of the information processing system 1 is described. The third behavior includes a behavior of the information processing system 1 in which the information-to-be-transmitted is transmitted from the terminal device 20 to the server device 10.

In Step S300, the terminal device 20 transmits the information-to-be-transmitted to the server device 10 via the transmission queue.

In Step S301, the terminal device 20 deletes the token(s) included in the information-to-be-transmitted after transmitted from the terminal storage unit 22.

In Step S302, the server device 10 extracts the updating instruction and the token(s) from the information-to-be-transmitted received from the terminal device 20.

In Step S303, the server device 10 determines whether or not the token(s) extracted in Step S302 and the token(s) stored in the server storage unit 12 in Step S101 are matched with each other. When it is determined that the both are matched (Step S303-Yes), a process proceeds to Step S304. On the other hand, when it is determined that the both are not matched (Step S303-No), a process proceeds to Step S306.

In Step S304, when it is determined that the both are matched in Step S303 (Step S303-Yes), the server device 10 updates the server-side game data based on the first instruction included in the updating instruction.

In Step S305, the server device 10 deletes the token(s), which is/are matched with the token(s) extracted in Step S302 and stored in the server storage section 12, or it stocks such token(s) in the log information as a used token(s).

In Step S306, when it is determined that the both are not matched in Step S303 (Step S303-No), the server device 10, based on the second instruction included in the updating instruction, does not update the server-side game data but modify the evaluation information stored in the storage unit 12.

With reference to FIG. 11, a flow of a fourth behavior of the terminal device 20 is described. The fourth behavior includes a behavior of the terminal device 20 in which progress of the game is suspended.

In Step S400, the terminal device 20 determines whether or not the number of token(s) stored in the terminal storage unit 22 has decreased to the predetermined value. When it is determined that the number of token(s) has decreased to the predetermined value (Step S400-Yes), a process proceeds to Step S401. On the other hand, when it is not determined that the number of token(s) has decreased to the predetermined value (Step S400-No), a process proceeds to Step S403.

In Step S401, when it is determined in Step S400 that the number of token(s) has decreased to the predetermined value (Step S400-Yes), the terminal control unit 25 transmits a retrieving request of a new token(s) to the server device 10.

In Step S402, the terminal control unit 25 suspends progress of the game until receiving the new token(s) from the server device 10 to store it/them in the terminal storage unit 22. When progress of the game resumes, a process turns back to Step S400.

In Step S403, when it is not determined in Step S400 that the number of token(s) has decreased to the predetermined value (Step S400-No), the terminal control unit 25 determines whether or not the number of un-transmitted information included in the transmission queue has increased to reach the first predetermined value. When it is determined that the number of un-transmitted information has reached the first predetermined value (Step S403-Yes), a process proceeds to Step S404. On the other hand, when it is not determined that the number of un-transmitted information has reached the first predetermined value (Step S403-No), a process turns back to Step S400.

In Step S404, when it is determined that the number of un-transmitted information has reached the first predetermined value in Step S403 (Step S403-Yes), the terminal control unit 25 suspends progress of the game until at least one of information is transmitted to the server device 10 via the transmission queue. When progress of the game resumes, a process turns back to Step S400.

As described above, the terminal device 20 receives from the server device 10 the token(s) generated and stored in the server device 10 to store it/them in the terminal storage unit 22. The terminal device 20 transmits the information-to-be-transmitted including the token(s) to the server device 10. The terminal device 20 deletes such token(s) stored in the terminal storage unit 22. Here, the information-to-be-transmitted includes the updating instruction to update the server-side game data stored in the server device 10 when the token(s) included in such information-to-be-transmitted and the token(s) stored in the server device 10 are matched. According to such a configuration, when the token(s) received from the terminal device 20 and the token(s) stored in the server device 10 are not matched, the server-side game data are not updated. Therefore, for example, when the user falsifies the terminal-side game data due to fraudulent action, the probability that the server-side game data are updated so as to be matched with the terminal-side game data after falsified is reduced. Therefore, the probability that the game data are falsified due to fraudulent action of the user who uses the terminal device 20 is reduced. For example, when a rate of processing of the terminal device 20 is increased as processing capability of the terminal device 20 is improved, the risk of fraudulent action by the user who uses the terminal device 20 may be increased. This embodiment is particularly suitable in such a case.

Although the present invention has been described with reference to figures and embodiments, it should be noted that those skilled in the art can easily make various modifications and improvements based on the present disclosure. It is therefore to be noted that these modifications and improvements are included within the scope of the present invention. For example, it is possible to relocate various functions and the like included in each means and in each step, etc. so as not to be logically inconsistent, and it is possible to combine plural means and steps into one or divide plural means and steps.

For example, in the above-described embodiments, a configuration in which the terminal device 20 executes a part or all of behaviors and processing executed by the server device 10 may be allowable. Likewise, a configuration in which the server device 10 may execute a part of behaviors executed by the terminal device 20 may be allowable. For example, processing such as a display control of various screens to be displayed on the terminal device 20 and a control of various GUIs may be executed by one of the server device 10 and the terminal device 20, alternatively it may be executed by the server device 10 and the terminal device 20 in cooperation.

Further, in the above-described embodiment, the exemplified behaviors of the server device 10 and the terminal device 20 have been described with reference to FIGS. 8 to 11. However, some steps included in such behaviors, or some behaviors included in one step may be omitted. The order of a plurality of steps may be changed within a logically consistent range.

Furthermore, in the above-described embodiment, the information-to-be-transmitted to be transmitted from the terminal device 20 to the server device 10 includes the encrypted information obtained by encrypting the information-to-be-encrypted using the secret key stored in the terminal device 20. Here, the information-to-be-encrypted may be encrypted using, for example, a public key transmitted in advance from the server device 10 to the terminal device 20. In such a case, the server device 10 decrypts the encrypted information included in the information-to-be-transmitted received from the terminal device 20 using a secret key stored in advance in the server storage unit 12. Alternatively, a configuration in which the information-to-be-transmitted includes the information-to-be-encrypted having been not encrypted may be allowable. In such a case, there is no need to encrypt the information-to-be-encrypted in the terminal device 20, and there is no need to decrypt it in the server device 10.

Furthermore, in the above-described embodiment, a configuration in which information indicating priority is further included in the information-to-be-transmitted from the terminal device 20 to the server device 10 may be allowable. For example, when difference data indicating the difference between before and after updating the terminal-side game data are generated as described above, the terminal control unit 25 may determine the priority based on such difference data. A higher priority may be set to the difference data having larger impact on progress of the game. More specifically, when an ID of a game content included in the difference data is, for example, an ID of a specific game content having a higher rare value in the game, the terminal control unit 25 may determine a higher priority to such ID than usual. Alternatively, when a difference value of the owned number of game content of the user indicated in the difference data are not less than a predetermined reference value, the terminal control unit 25 may determine a higher priority to such difference value than usual. A correspondence relation between the ID of the game content or the reference value and the priority may be established in advance. Multiple levels of the priority may be established. Information indicating the priority may be included in the information-to-be-transmitted without encrypted, alternatively it may be included in the information-to-be-transmitted with encrypted.

Upon receiving the information-to-be-transmitted from the terminal device 20, the server control unit 13 may determine, based on the priority indicated in such information-to-be-transmitted and a processing load of the server control unit 13, whether or not the token(s) to be extracted from such information-to-be-transmitted and the token(s) stored in the server storage unit 12 are matched. For example, when the processing load of the server control unit 13 is not less than a predetermined criterion, the above processing of determining matchingness in terms of the token(s) may be executed only for the information-to-be-transmitted with a higher priority. According to such a configuration, for example, even when the processing load of the server device 10 is relatively higher, the probability that fraudulent action of the user is detected is increased.

Furthermore, when the both are not matched, or when the updating instruction is only received without receiving the token(s) from the terminal device 20, the server control unit 13 may modify the evaluation information of the user based on the priority. For example, the server control unit 13 may modify the evaluation information so that the evaluation of such user is largely made lower as the priority is higher. According to such a configuration, the evaluation of such user is largely made lower as the impact of fraudulent action of the user on progress of the game is larger. Therefore, for example, the probability that a user performing malicious fraudulent action can be specified is increased.

Furthermore, in the above-described embodiment, at least a part of the screen to be displayed on the terminal device 20 may be configured in a web display to be displayed on the terminal device 20 based on data created by the server device 10, and at least a part of the screen may be configured in a native display to be displayed by a native application installed in the terminal device 20. In this manner, the game according to the above-described embodiment may be configured in a hybrid game in which the server device 10 and the terminal device 20 take a part of processing, respectively.

Furthermore, an information processing device such as a computer or a cellular phone may be preferably used in order to make it function as the server device 10 or the terminal device 20 according to the above-described embodiment. Such an information processing device may be achieved by storing in a storage unit of the information processing device a program describing processing contents to realize each function of the server device 10 or the terminal device 20 according to the embodiment, and then by reading and executing such program by means of CPU of the information processing device.

REFERENCE SIGNS LIST

1: information processing system
10: server device
11: server communication unit
12: server storage unit
13: server control unit
20: terminal device
21: terminal communication unit
22: terminal storage unit
23: display unit
24: input unit
25: terminal control unit
30: network
40: game screen
41: user character
42: first information
43: second information

The invention claimed is:

1. A non-transitory computer-readable storage medium storing a program configured to cause a terminal device to execute a game in communication with a server device, the program comprising:
   a first storing step of receiving from the server device at least one token information previously generated and stored in the server device to store the token information in a terminal storage unit of the terminal device;
   a generating step of generating, when game data of the game in the terminal device is updated as a result of executing a game process of the game in the terminal device, the game process occurring while a player plays the game,
      an updating instruction for updating corresponding game data of the game of a user of the terminal device stored in the server device, and
      information-to-be-encrypted that includes at least one token information selected among the token information stored in the terminal storage unit;
   a transmitting step of transmitting to the server device information-to-be-transmitted including the updating instruction and encrypted information obtained by encrypting the information-to-be-encrypted; and
   a deleting step of deleting, after at least the generating step, the token information that is used in the generating step,
   wherein the updating instruction includes update information and a first instruction to update the corresponding game data of the user stored in the server device based on the update information when the token information, extracted from the encrypted information after decrypting the encrypted information transmitted from the terminal device, matches one of the token information previously stored in the server device.

2. The non-transitory computer-readable storage medium according to claim 1,
   wherein the update information indicates a difference between game data of the game before being updated and after being updated as the result of executing the game process in the terminal device, and
   wherein the information-to-be-encrypted further includes information for reproduction to be used in reproducing the executed game process.

3. The non-transitory computer-readable storage medium according to claim 2,
   wherein the game process is executed in part of a plurality of game parts included in the game, and
   wherein the information for reproduction includes at least one of information indicating a game part having been executed in the game process and a game parameter used in the game process.

4. The non-transitory computer-readable storage medium according to claim 3,
wherein the game process includes a lottery process using a random seed to be retrieved from the server device, and
wherein the information for reproduction includes at least one of a random seed value used in the lottery process, a result value of lottery, a minimum value of lottery, a maximum value of lottery, and the number of trials of lottery.

5. The non-transitory computer-readable storage medium according to claim 4,
wherein the updating instruction includes a second instruction to modify evaluation information stored in the server device to indicate an evaluation of the user when the token information, extracted from the encrypted information after decrypting the encrypted information transmitted from the terminal device, does not match any of the token information previously stored in the server device.

6. The non-transitory computer-readable storage medium according to claim 4,
wherein the program further comprises a second storing step of receiving from the server device at least one new token information generated and stored in the server device to store the new token information in the terminal storage unit.

7. The non-transitory computer-readable storage medium according to claim 6,
wherein, in the first storing step, a plurality of token information different from each other generated and stored in the server device are received from the server device to be stored in the terminal storage unit, and
wherein the program further comprises a first suspending step of suspending progress of the game until the second storing step is executed when a number of token information stored in the terminal storage unit decreases to a predetermined value.

8. The non-transitory computer-readable storage medium according to claim 4,
wherein, in the transmitting step, the information-to-be-transmitted is transmitted to the server device via a transmission queue, and
wherein the program further comprises a suspending step of suspending progress of the game, when a number of un-transmitted information included in the transmission queue reaches a predetermined value, until at least one of the un-transmitted information is transmitted to the server device via the transmission queue.

9. The non-transitory computer-readable storage medium according to claim 2,
wherein the game process includes a lottery process using a random seed to be retrieved from the server device, and
wherein the information for reproduction includes at least one of a random seed value used in the lottery process, a result value of lottery, a minimum value of lottery, a maximum value of lottery, and the number of trials of lottery.

10. The non-transitory computer-readable storage medium according to claim 1,
wherein the updating instruction includes a second instruction to modify evaluation information stored in the server device to indicate an evaluation of the user when the token information, extracted from the encrypted information after decrypting the encrypted information transmitted from the terminal device, does not match any of the token information previously stored in the server device.

11. The non-transitory computer-readable storage medium according to claim 10,
wherein the program further comprises a second storing step of receiving from the server device at least one new token information generated and stored in the server device to store the new token information in the terminal storage unit.

12. The non-transitory computer-readable storage medium according to claim 10,
wherein, in the transmitting step, the information-to-be-transmitted is transmitted to the server device via a transmission queue, and
wherein the program further comprises a suspending step of suspending progress of the game, when a number of un-transmitted information included in the transmission queue reaches a predetermined value, until at least one of the un-transmitted information is transmitted to the server device via the transmission queue.

13. The non-transitory computer-readable storage medium according to claim 1,
wherein the program further comprises a second storing step of receiving from the server device at least one new token information generated and stored in the server device to store the new token information in the terminal storage unit.

14. The non-transitory computer-readable storage medium according to claim 13,
wherein, in the first storing step, a plurality of token information different from each other generated and stored in the server device are received from the server device to be stored in the terminal storage unit, and
wherein the program further comprises a first suspending step of suspending progress of the game until the second storing step is executed when a number of token information stored in the terminal storage unit decreases to a predetermined value.

15. The non-transitory computer-readable storage medium according to claim 1,
wherein, in the transmitting step, the information-to-be-transmitted is transmitted to the server device via a transmission queue, and
wherein the program further comprises a suspending step of suspending progress of the game, when a number of un-transmitted information included in the transmission queue reaches a predetermined value, until at least one of the un-transmitted information is transmitted to the server device via the transmission queue.

16. The non-transitory computer-readable storage medium according to claim 1,
wherein the transmitting step is executed in response to occurrence of a predetermined event in the game.

17. The non-transitory computer-readable storage medium according to claim 1,
wherein in the generating step, information indicating priority is generated to be included in the information-to-be-transmitted.

18. The non-transitory computer-readable storage medium according to claim 1,
wherein the update information indicates a difference between game data of the game before being updated and after being updated as the result of executing the game process in the terminal device, and
wherein in the generating step, information indicating priority is generated to be included in the information-to-be-transmitted, the priority being set based on the update information such that a higher priority is set when the difference causes a larger impact on progress of the game.

19. The non-transitory computer-readable storage medium according to claim 1, wherein the terminal device is a mobile device.

20. A terminal device executing a game in communication with a server device, comprising:
   a terminal storage unit; and
   a terminal control unit,
   wherein the terminal control unit executes:
      receiving from the server device a token information previously generated and stored in the server device to store the token information in the terminal storage unit of the terminal device;
      generating, when game data of the game in the terminal device is updated as a result of executing a game process of the game in the terminal device, the game process occurring while a player plays the game,
         an updating instruction for updating corresponding game data of the game of a user of the terminal device stored in the server device, and
         information-to-be-encrypted that includes at least one token information selected among the token information stored in the terminal storage unit;
      transmitting to the server device information-to-be-transmitted including the updating instruction and encrypted information obtained by encrypting the information-to-be-encrypted; and
      deleting, after at least the generating, the token information that is used in the generating step,
   wherein the updating instruction includes update information and an instruction to update the corresponding game data of the user stored in the server device based on the update information when the token information extracted from the encrypted information after decrypting the encrypted information transmitted from the terminal device, matches one of the token information previously stored in the server device.

21. The terminal device according to claim 20, wherein the terminal device is a mobile device.

22. An information processing system executing a game, comprising:
   a server device; and
   a terminal device,
   wherein the server device executes:
      storing game data of a user in a server storage unit;
      generating token information to store the token information in the server storage unit; and
      transmitting the token information to the terminal device,
   wherein the terminal device executes:
      receiving the token information from the server device to store the token information in a terminal storage unit of the terminal device;
      generating, when game data of the game in the terminal device is updated as a result of executing a game process of the game in the terminal device, the game process occurring while a player plays the game,
         an updating instruction for updating corresponding game data of the game of a user of the terminal device stored in the server device, and
         information-to-be-encrypted that includes at least the token information stored in the terminal storage unit;
      transmitting to the server device information-to-be-transmitted including the updating instruction and encrypted information obtained by encrypting the information-to-be-encrypted; and
      deleting, after at least the generating, the token information that is used in the generating step,
   wherein the server device executes:
      receiving the information-to-be-transmitted from the terminal device to decrypt the encrypted information included in the information-to-be-transmitted and extracting the token information;
      updating the game data stored in the server storage unit based on the update information when the extracted token information matches the token information previously stored in the server storage unit; and
      deleting the token information stored in the server storage unit.

23. The information processing system according to claim 22, wherein the terminal device is a mobile device.

* * * * *